(12) United States Patent
Kuroki et al.

(10) Patent No.: US 7,551,377 B2
(45) Date of Patent: Jun. 23, 2009

(54) PROJECTION DISPLAY APPARATUS

(75) Inventors: Futoshi Kuroki, Nagano (JP); Toshimitsu Iwai, Tokyo (JP); Hiroshi Kida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 220 days.

(21) Appl. No.: 11/636,472

(22) Filed: Dec. 11, 2006

(65) Prior Publication Data

US 2007/0133109 A1    Jun. 14, 2007

(30) Foreign Application Priority Data

Dec. 12, 2005    (JP) .............................. 2005-357557

(51) Int. Cl.
*G02B 7/02* (2006.01)
*G02B 25/00* (2006.01)
(52) U.S. Cl. ...................................... 359/827; 359/645
(58) Field of Classification Search .................. 359/827
See application file for complete search history.

(56) References Cited

U.S. PATENT DOCUMENTS 4,062,030 A * 12/1977 Starp ............................ 396/531
6,292,142 B1 * 9/2001 Pittman ............... 343/700 MS

FOREIGN PATENT DOCUMENTS

JP         2004-54040 A      2/2004

* cited by examiner

*Primary Examiner*—Jordan M. Schwartz
*Assistant Examiner*—James C Jones
(74) *Attorney, Agent, or Firm*—Birch, Stewart, Kolasch & Birch, LLP (57) ABSTRACT

The projection display apparatus includes rotation regulating elements for inhibiting a rotation of the mount ring in a tightening direction, and a stopper element displaceable between a non-locked position and a locked position, wherein the stopper element is displaced to the non-locked position when the mount ring is rotated to a rotating position in a loosening direction from a predetermined position in the tightening direction, and is displaced to the locked position when the mount ring is rotated to the predetermined position in the tightening direction.

3 Claims, 7 Drawing Sheets

PROJECTION DISPLAY APPARATUS

BACKGROUND OF THE INVENTION

1. Field of the Invention

The present invention relates to a projection display apparatus in which a projection lens barrel is capable of being interchanged.

2. Description of the Background Art

The projection display apparatus configured so that the lens barrel is selected and interchanged according to the size of the screen or the distance to the screen is being widely used. In such a projection display apparatus, a so-called bayonet type is sometimes adopted for the attachment part with respect to the projection lens barrel in terms of facilitating the removal and ensuring the reliability of attachment.

The bayonet type is configured so that a bayonet flange arranged on the projection lens barrel side is sandwiched between the nail part of a mount ring to be screw coupled to the side of the projection display apparatus and the mounting surface, and the mount ring is rotated about the screw coupling part to be tightened to the mounting surface side thereby fixing the bayonet flange between the nail of the mount ring and the mounting surface (see e.g., Japanese Patent Application Laid-Open No. 2004-54040 (see abstract etc).

However, in the bayonet type, the worker tends to tighten the mount ring in excess to ensure attachment, thereby breaking the screw thread of the screw coupling part of the mount ring and the projection display apparatus.

In particular, the weight of the projection lens barrel used in the projection display apparatus is heavy since a lens of large aperture must be used to increase the lighting of the projecting image, and thus the worker is further motivated to tighten the mount ring more strongly.

In Japanese Patent Application Laid-Open No. 2004-54040 (see abstract etc), a configuration of preventing the mount ring from loosening is disclosed, but the prevention of the turning of the mount ring and the release thereof is performed by removing the lens hood, and thus the work becomes troublesome since the lens hood must be removed each time the projection lens barrel is to be removed.

SUMMARY OF THE INVENTION

The present invention aims to provide a projection display apparatus in which the mounting ring is from being tightened in excess, and in which loosening of the mount ring is easily prevented.

The projection display apparatus of the present invention is a projection display apparatus in which a projection lens barrel is capable of being interchanged. The projection display apparatus includes a rotation regulating element, a stopper element, and an engagement element. The rotation regulating element inhibits the rotation in a tightening direction of a mount ring for fixing the projection lens barrel to the projection display apparatus. The stopper element is displaceable between a non-locked position for allowing the rotation of the mount ring and a locked position for inhibiting the rotation of the mount ring in a loosening direction, and is biased from the non-locked position to the locked position by a biasing element. The engagement element is arranged on the mount ring and displaces the stopper element to the non-locked position against the bias by the biasing element by contacting a front end of the stopper element when the mount ring is rotated to a rotating position in the loosening direction from a predetermined position to be tightened, and is released from contact with the stopper element and engages the stopper element displaced to the locked position in the loosening direction of the mount ring when the mount ring is rotated to the predetermined position.

When the mount ring is rotated to the predetermined position in the tightening direction, the mount ring does not further rotate, and thus the breakage of the mount ring due to excess tightening is prevented. Furthermore, when the mount ring is rotated to the predetermined position in the tightening direction, the stopper element is automatically displaced from the non-locked position to the locked position, and the rotation of the mount ring in the loosening direction is inhibited.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are views explaining the operation of the mount ring in the projection display apparatus shown in FIG. 1.

FIGS. 6A to 6C are exploded perspective views showing the configuration of the attachment part to the mount substrate of the projection lens barrel of the projection display apparatus shown in FIG. 1. FIGS. 7A to 7C are perspective views showing the configuration of the attachment part to the mount substrate of the projection lens barrel of the projection display apparatus shown in FIG. 1.

DESCRIPTION OF THE PREFERRED EMBODIMENTS

The embodiments of the projection display apparatus according to the present invention will now be described with reference to FIGS. 1 to 4, FIGS. 5A and 5B, FIGS. 6A to 6C and FIGS. 7A to 7C. A projection display apparatus including a micromirror display device as a light modulating element is described as the projection display apparatus by way of example in the present embodiment, but is not limited thereto, and may be other types of projection display apparatus such as a so-called liquid crystal projector etc. that uses a liquid crystal display device as the light modulating element. The micromirror display device is a light modulating device in which a large number of square micromirrors each having some μm side are arranged on a silicon substrate, inclination of the micromirrors is changed utilizing electrostatic attraction, thereby controlling whether light from a light source should be reflected in a direction of a screen. This micromirror display device generally has the same function as that of an element called DMD (Digital Micromirror Device) that is a trade name of Texas Instruments Incorporated.

Figure 1:
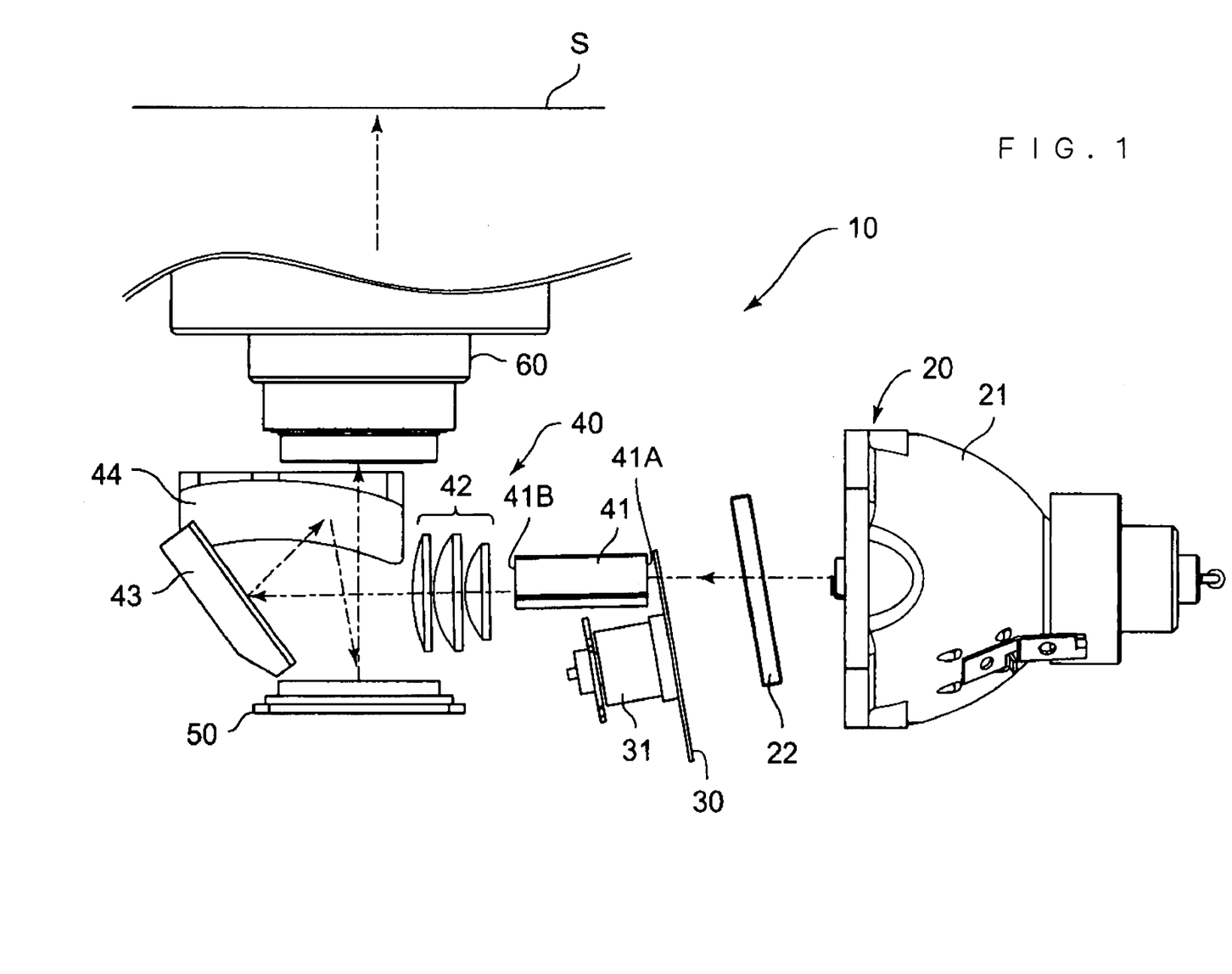
FIG. 1 is a configuration view showing an entire configuration of a projection display apparatus according to an embodiment of the present invention.

The entire configuration of the projection display apparatus (hereinafter referred to simply as projection display apparatus) 10 including micromirror display device according to the present embodiment will now be described with reference to FIG. 1.

The projection display apparatus 10 is configured with a lamp 20 serving as a light source, a color wheel (hereinafter referred to as CW) 30, an illumination optical system 40, a micromirror display device 50 serving as a light modulating element, a projection lens barrel 60 etc. accommodated in an exterior housing (not shown).

In the following description, the projection lens barrel 60 side is the front (front side) and the lamp 20 side is the back (back side) in the direction of the optical axis of the illumination light from the lamp 20 to the projection lens barrel 60. In FIG. 1, description is made with the surface side of the drawing as above (upper side) of the projection display apparatus 10 side, the back surface side as below (lower side), and the direction orthogonal to the optical axis and to the up and down direction toward the advancing direction of the illumination light as left and right direction (width direction).

The lamp 20 is configured by ultra-high pressure mercury lamp etc. and emits light of white color. The lamp 20 has an elliptical reflection mirror 21, the luminescence point of the lamp 20, that is, the filament portion or discharging portion is arranged at a first focal point of the elliptical reflection mirror 21, and the illumination light irradiated from the luminescence point is collected at the second focal point of the elliptical reflection mirror 21.

The CW 30 is arranged between the lamp 20 and the position where the illumination light is collected. The CW 30 is formed in a circular disc shape, and for example, is configured by being divided into three so that a filter portion transmitting the green light, a filter portion transmitting a red light, and a filter portion transmitting blue light are arranged in a fan shape with respect to the center of the circle. When the CW 30 is rotated by a motor 31, each filter is sequentially counterchanged in the optical path of the illumination light, and the illumination light of the lamp 20 is modulated by the transmitted color of each filter at time division. An explosion-protection glass 22 is arranged between the lamp 20 and the CW 30. The explosion-protection glass 22 prevents the glass fragments from scattering to the CW 30 side when the ultra-high pressure mercury lamp explodes, thereby preventing the components of the CW 30 and the like from breaking.

A rod integrator 41 and a light collecting lens 42 configuring the illumination optical system 40 are arranged on the exit side of the illumination light of the CW 30. The rod integrator 41 is arranged so that the position of the opening 41A on the incident side coincides with the second focal point of the elliptical reflection mirror 21, that is, the position where the illumination light exited from the lamp 20 is collected. Thus, the illumination light reflected by the elliptical reflection mirror 21 all enters the rod integrator 41 except for the loss reflected or absorbed by the explosion-protection glass 22, the CW 30 and the like. The illumination light that has entered the rod integrator 41 exits from the opening 41B on the exit side of the rod integrator 41 as the illumination light having an uniform illumination distribution by repeating reflection over a plurality of times at the reflection surface on the inside. The illumination light exited from the rod integrator 41 is transmitted through the light collecting lens 42, is reflected at a plan mirror 43 and a concave mirror 44, and is entered into the micromirror display device 50.

The light collecting lens 42, the plane mirror 43 and the concave mirror 44 are configured so as to satisfy an optically conjugate relationship between the opening 4B of the rod integrator 41 and the reflection surface, which is the light modulating surface, of the micromirror display device 50. Thus, a light image at the opening 41B is imaged on the reflection surface of the micromirror display device 50.

The micromirror display device 50 is drive controlled based on an image signal from the control circuit (not shown) and divides the illumination light from the lamp 20 to a reflected light (so-called ON light) to be reflected towards the projection lens barrel 60, and a light (so-called OFF light) to be reflected to the position not entering the projection lens barrel 60.

The projection lens barrel 60 is responsible of satisfying an optically conjugate relationship between the reflection surface of the micromirror display device 50 and the screen S. Thus, the image produced by the ON light of the micromirror display device 50 is projected in an enlarged manner, and imaged as the projection image onto the screen S.

The illumination light of green light, red light and blue light modulated by the CW 30 enters the micromirror display device 50 at time division. Therefore, the projection image for each color light is projected onto the screen S at time division. Since the CW 30 is rotated at high speed exceeding a few thousand rotations per minute to ten thousand rotations per minute by the rotation motor 31, the projection image of each color light projected onto the screen S is also switched at very high speed in accordance with the rotation speed of the CW 30. Therefore, the image having a color tone which is obtained by synthesizing the projection image of each color light appears in the eye of the human looking at the projection image projected onto the screen S due to an afterimage effect of the eye. The OFF light is configured so as to be reflected from the micromirror display device 50 towards the direction of upper right side against the projection lens barrel 60 in the present embodiment.

Figure 2:
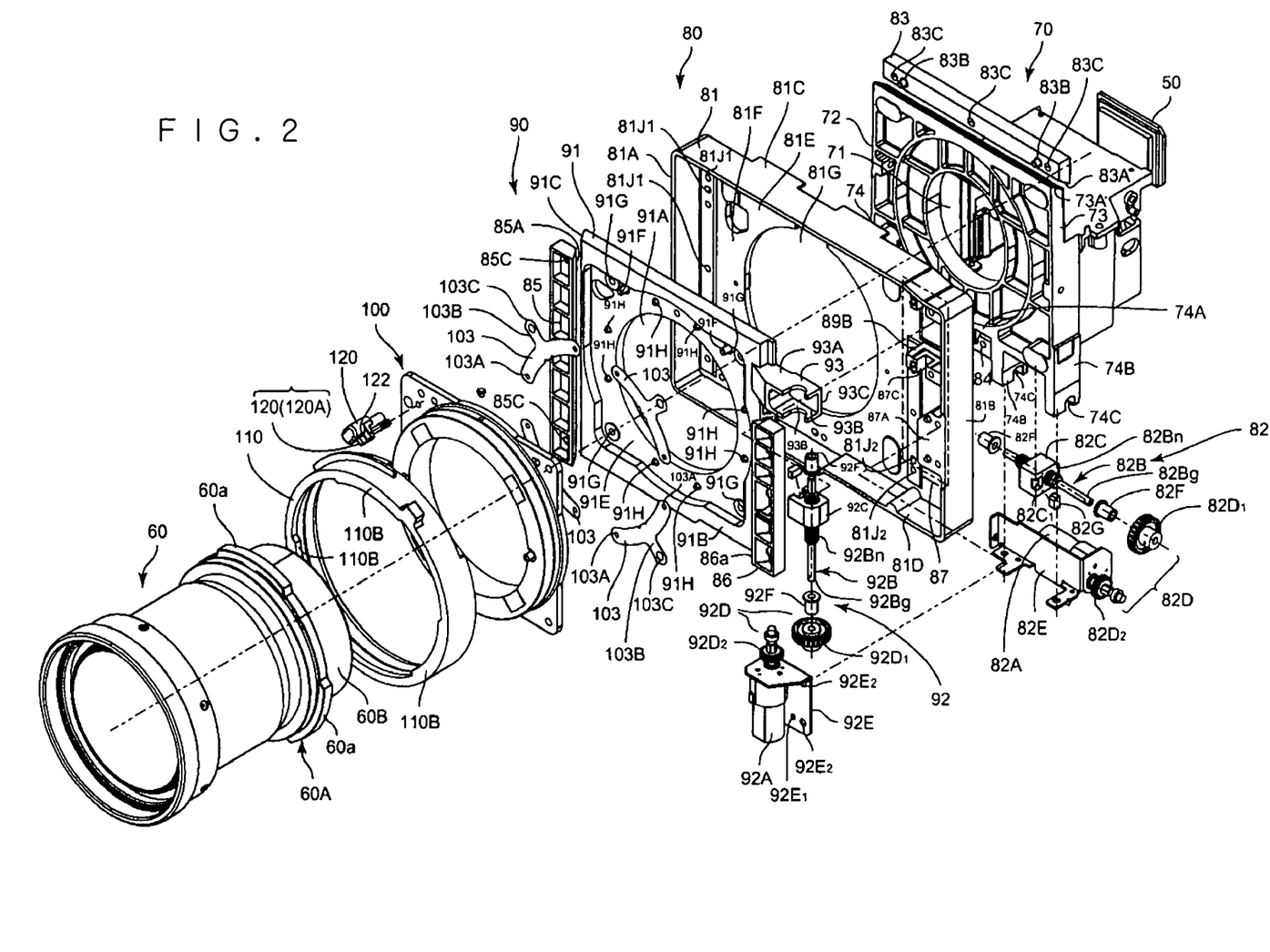
FIG. 2 is an exploded perspective view showing the configuration on the front side from a micromirror display device holding housing of the projection display apparatus shown in FIG. 1.
Figure 3:
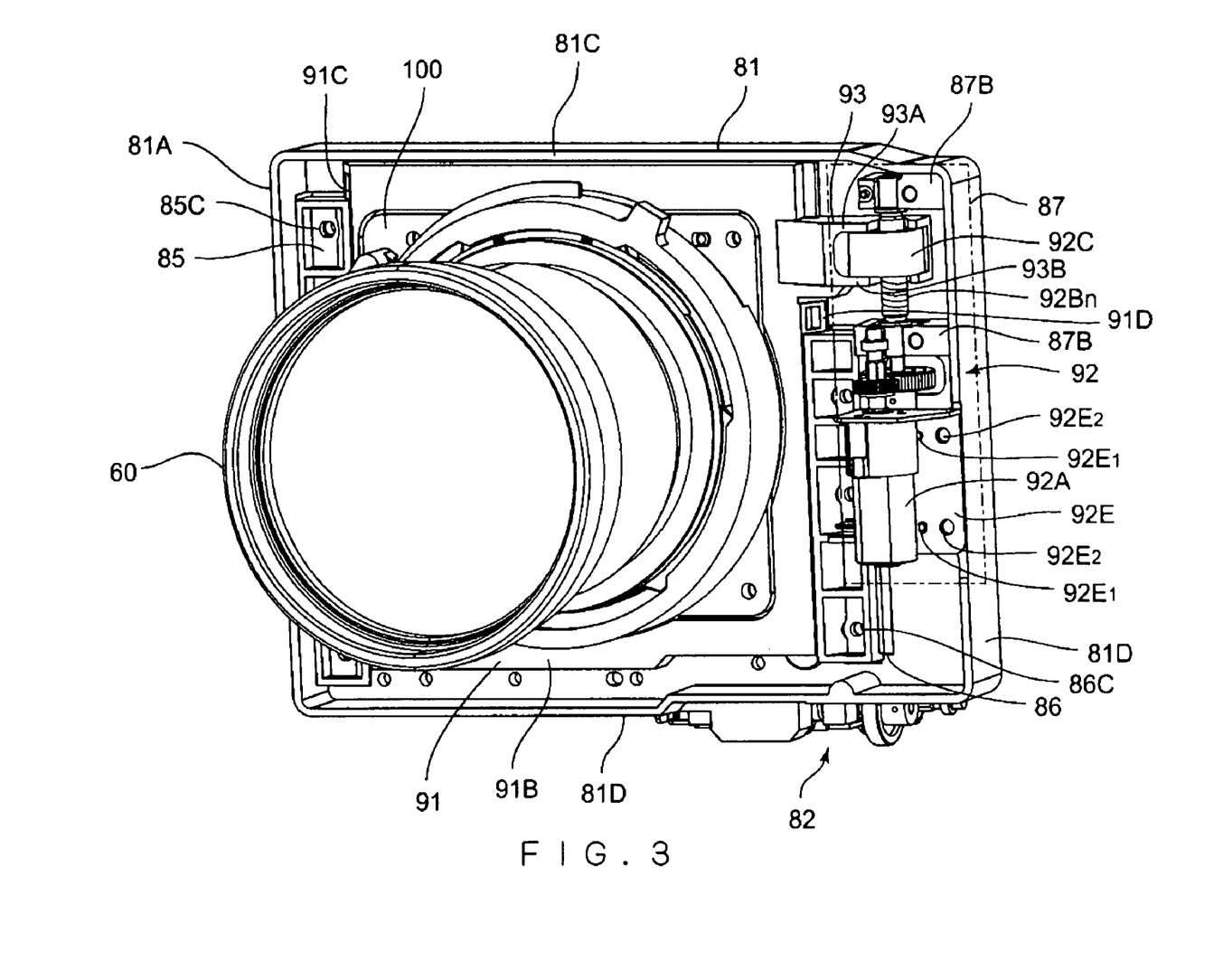
FIG. 3 is a perspective view of the front portion from the micromirror display device holding housing of the projection display apparatus shown in FIG. 1.

The detailed description of the projection display apparatus 10 will now be described with reference to FIGS. 2 and 3 in addition to FIG. 1. FIG. 2 is an exploded perspective view showing the configuration of a first lens barrel shift mechanism 80, a second lens barrel shift mechanism 90, the projection lens barrel 60 and the like, and the relationship of the arrangement thereof in an easily understandable manner. FIG. 3 is a perspective view seen diagonally from the front left with the first lens barrel shift mechanism 80, the second lens barrel shift mechanism 90, the projection lens barrel 60 and the like attached to a micromirror display device holding housing 70.

The parallel mirror 43 and the concave mirror 44 are arranged in the micromirror display device holding housing 70 so that the illumination light exiting from the light collecting lens 42 is reflected at the micromirror display device 50 and entered into the projection lens barrel 60. The micromirror display device holding housing 70 is formed by a member made of metal such as magnesium alloy and the like, has a substantially rectangular solid shape, and is formed with an opening (not shown) through which the illumination light exited from the light collecting lens 42 passes on the right side surface. An opening (not shown) to which the micromirror display device 50 is attached is formed on the back side surface. The micromirror display device 50 is attached to the micromirror display device holding housing 70 from the back side of the micromirror display device holding housing 70 so that the light modulating surface of the micromirror display device 50 faces the inner side of the micromirror display device holding housing 70 through the opening. Furthermore, an opening 71 through which the illumination light reflected from the micromirror display device 50 towards the projection lens barrel 60 passes is formed on the front side. The micromirror display device holding housing 70 is fixedly attached to the exterior housing (not shown) where the lamp 20, CW 30 and the like are accommodated. As shown in FIG. 2, the first lens barrel shift mechanism 80, the second lens barrel shift mechanism 90, the projection lens barrel 60 and the like are sequentially attached to the micromirror display device holding housing 70 towards the front.

The first lens barrel shift mechanism 80 includes a first moving body 81 supported so as to be movable in the left and right direction with respect to a moving body supporting part 72 integrally formed on the front surface portion of the micromirror display device holding housing 70, and a first driving system section 82 for moving the first moving body 81 in the left and right direction with respect to the micromirror display device holding housing 70.

The moving body supporting part 72 has a square outer peripheral shape when seen from the front direction and is configured by a flange shaped part 73 that projects upward from the surface on the upper side of the micromirror display device holding housing 70 and a flange shaped part 74 projecting downward from the surface on the lower side. The opening 71 through which the illumination light reflected from the micromirror display device 50 towards the projection lens 60 passes is formed on the inner side of the moving body supporting part 72.

A guide part 73A for supporting and guiding movably in the left and right direction the first moving body 81 is arranged on the upper side of the flange shaped part 73. A guide part 74A for supporting and guiding movably in the left and right direction the first moving body 81 is also arranged on the lower side of the flange shaped part 74.

The guide part 73A is configured by an inclined surface inclined to the lower side from the front to the back, and formed across the entire region in the width direction of the flange shaped part 73 in the left and right direction. The guide part 74A is configured by an inclined surface inclined to the upper side from the front to the back, and formed from substantially the middle to the right side of the flange shaped part 74 in the left and right direction. The guide part 73A and the guide part 74A are parallel to each other in the left and right direction. Since the guide part 74A is arranged on the back side of the first moving body 81, only the end on the left side is shown in FIG. 2.

The first moving body 81 is formed by a member made of metal such as aluminum alloy etc., and has a box shape having an outer peripheral shape of a square, as a whole. The first moving body 81 has left and right side plates 81A, 81B, upper and lower side plates 81C, 81D, and a bottom plate 81E arranged at the back side of the side plates 81A, 81B, 81C, 81D. The front portion of the first moving body 81 is opened as the opening 81F. A circular opening 81G through which the illumination light from the micromirror display device 50 towards the projection lens 60 passes is formed slightly towards the right side from the center at the bottom plate 81E.

A guiding part 83 is attached on the upper edge of the surface on the back side of the bottom plate 81E. A guiding part 83 is formed from resin such as polycarbonate and the like. A guiding part 84 is attached on the lower edge of the surface on the back side of the bottom plate 81E. A guiding part 84 is formed from resin such as polycarbonate and the like, similar to the guiding part 83.

The guiding part 83 has a guiding surface 83A on the lower side thereof. The guiding surface 83A inclines to the lower side from the front to the back. The guiding part 83 presents a cross sectional shape of a substantially trapezoid shape cut at the plane in the up and down direction along the front and back direction. The length in the left and right direction of the guiding surface 83A is the same length as in the left and right direction of the guide part 73A. A boss 83B is formed on the front surface of the guiding part 83. A boss hole (not shown), in which the boss 83B is inserted, is formed in the surface on the back side of the bottom plate 81E. The guiding part 83 is positioned on the bottom plate 81E with the boss 83*b* inserted to the boss hole, a screw (not shown) is inserted to a screw insertion hole 83C of the guiding part 83 and the screw is screw coupled to a screw hole (not shown) formed in the bottom plate 81E, thereby the guiding part 83 is fixed to the bottom plate 81E.

The guiding part 84 has a guiding surface (not shown) on the upper side thereof The guiding surface inclines to the upper side from the front to the back. The guiding part 84 presents a cross sectional shape of substantially trapezoid shape, similar to the guiding part 83. The length in the left and right direction of the guiding surface (guiding surface (not shown) of the guiding part 84) is the same length as in the left and right direction of the guide part 74A. Similar to the guiding part 83, the guiding part 84 is fixed to the bottom plate 81E by the screw while being positioned with a boss formed on the guiding part 84 and a boss hole formed on the bottom plate 81E side.

The guiding part 83 and the guiding part 84 are attached to the bottom plate 81E so that the guiding surface 83A and the guiding surface (guiding surface (not shown) of the guiding part 84) are parallel in the left and right direction. As described above, the guiding surface 83A is an inclined surface on the lower side which inclines to the lower side from the front to the back, and the guiding surface (guiding surface (not shown) of the guiding part 84) is an inclined surface on the upper side which inclines to the upper side from the front to the back. That is, the distance between the guiding surface 83A of the guiding part 83 and the guiding surface (not shown) of the guiding part 84 narrows from the front to the back. Therefore, the guiding surface 83A, the guiding surface (guiding surface (not shown) of the guiding part 84) and the back surface of the bottom plate 81E configure a so-called dovetail groove (concave part where the width on the opening side is narrower than the width on the back side). The moving body supporting part 72 is fitted into the dovetail groove so that the guide part 73A and the guiding surface 83A slidably contact each other, and the guide part 74A and the guiding surface (guiding surface (not shown) of the guiding part 84) also slidably contact each other, wherefore the first moving body 81 is supported movable in the left and right direction with respect to the moving body supporting part 72. In other words, the moving body supporting part 72 including the guide parts 73A, 74A act as the dovetail (convex part having the width on the distal end side wider than the width on the basal end side) that fits into the dovetail.

The first driving system section 82 includes a motor 82A, a feeding screw 82B, a coupling member 82C through which the feeding screw 82B passes and that screw-couples with the feeding screw 82B at the pass through part, and a gear train 82D and the like.

The motor 82A is fixedly attached to an exterior housing (not shown) by way of a holder 82E.

A pair of left and right feeding screw supporting parts 74B for supporting the feeding screw 82B are arranged on the left side from substantially the middle on the lower side of the flange shaped part 74, that is, on the left side of the guide part 74A. The pair of feeding screw supporting parts 74B is arranged with a distance in the left and right. Each feeding screw supporting part 74B is integrally formed with the flange shaped part 74, and is formed so as to project downward in a tongue form. The concave part towards the upper side from the lower end side is formed at the lower end of each feeding screw supporting part 74B as a bearing part 74C for pivotally supporting the feeding screw 82B.

In the feeding screw 82B, a shaft part 82Bg is arranged at both ends of the screw part 82Bn, which shaft part 82Bg is passed through the bearing sleeve 82F, and the bearing sleeve 82F is fitted into the bearing part 74C and fixed through methods of adhesion and the like. That is, the feeding screw 82B is supported by the feeding screw supporting part 74B through the bearing sleeve 82F. The shaft part 82Bg is held in a freely rotating manner in the sleeve of the bearing sleeve 82F. The feeding screw 82B is thus supported in a freely rotating manner with respect to the feeding screw supporting part 74B.

The shaft part 82Bg extending to the left side of the coupling member 82C is formed longer than the shaft part 82Bg extending to the right side of the coupling member 82C, and the shaft part 82Bg is projected from the left side surface of the feeding screw supporting part 74B positioned on the left side while being supported at the feeding supporting part 74B. The gear $82D_1$ of large diameter of the gear train 82D is attached to the projecting portion. The gear $82D_2$ of small diameter is attached to the output shaft of the motor 82A, and the rotational force of the motor 82A is reduced and transmitted to the feeding screw 82B via the gear train 82D configured by the gear $82D_2$ and the gear $82D_1$.

The coupling member 82C presents a substantially rectangular solid shape as a whole. The concave part $82C_1$ of a substantially rectangular solid is formed at the left side edge on the front side of the coupling member 82C, and a rubber strip 82G is fitted to the concave part $82C_1$. The rubber trip 82G is an elastically deformable elastic member that is formed by synthetic resin and the like such as silicon rubber having the size and shape so as to fill the concave part $82C_1$ and slightly projects from the surface on the left side of the concave part $82C_1$ (surface on the left side of the coupling member 82C). In the coupling member 82C, a portion including the concave part $82C_1$ at the front side of the portion where the feeding screw 82B passes through and an upper side portion of the portion where the feeding screw 82B passes through are fitted to a coupling member fit-in section (not shown) integrally formed on the bottom plate 81E.

The coupling member fit-in section (not shown) is formed from two left and right plate shaped projections that project in a tongue shape toward the lower side of the side plate 81D of the first moving body 81. The distance between the two projections (not shown) is set slightly wider than the width (thickness) in the left and right direction of the coupling member 82C, and slightly smaller than the width in the left and right direction of the coupling member 82C including the rubber strip 82G projecting from the surface on the left side of the concave part $82C_1$. Thus, the coupling member 82C is fitted to the coupling member fit-in section (not shown), that is, between two projections (not shown) against the elastic force of the rubber strip 82G projecting out from the surface on the left side of the concave part $82C_1$. Therefore, the surface on the right side of the coupling member 82C contacts the projection (not shown) on the right side, and the rubber strip 82G contacts the projection (not shown) on the left side.

The width (thickness) in the up and down direction of the coupling member 82C and the supporting position in the up and down direction of the feeding screw 82B by the feeding screw supporting part 74B are set so that a slight gap is formed between the surface part on the upper side of the coupling member 82C and the side plate 81D when the feeding screw 82B is supported at the feeding screw supporting part 74B.

The coupling member 82C attempts to rotate with the rotation of the feeding screw 82B, but the rotation is inhibited since the surface part on the upper side of the coupling member 82C contacts the side plate 81D. Since a slight gap is formed between the surface part on the back side of the coupling member 82C and the side plate 81D, the coupling member 82C may slightly rotate with rotation of the feeding screw 82B by the amount of the gap, but after rotating by the amount of the gap, the surface part on the upper side of the coupling member 82 contacts the side plate 81D and the rotation is inhibited. That is, the coupling member 82C is inhibited from rotating with the feeding screw 82B with respect to the coupling member fit-in section and is fitted thereto so as to have contacting parts in the left and right direction.

Therefore, when the coupling member 82C moves in the left and right direction when receiving the action of the feeding screw 82B, the first moving body 81 also moves with the guiding part 83 and the guiding part 84 guided by the guide part 73A and the guide part 74A.

The configuration of the coupling member fit-in section and the configuration of the coupling member 82C have the same configurations as the coupling member 92C and the coupling member fit-in section 93 to be hereinafter described in the second lens barrel shift mechanism 90, and the details thereof will be hereinafter described.

The second lens barrel shift mechanism 90 includes a second moving body 91 supported so as to be movable in the up and down direction with respect to the first moving body 81 and a second driving system section 92 for moving the second moving body 91 in the up and down direction with respect to the first moving body 81, that is, with respect to the micromirror display device holding housing 70.

The second moving body 91 is formed by a member made of metal such as aluminum alloy, has an outer peripheral shape of a square plate body, and formed at substantially the central part with a circular opening 91A through which the illumination light from the micromirror display device 50 to the projection lens 60 passes.

A thick part 91B is formed at the periphery of the second moving body 91. The side surface on the right side of the thick part 91B is formed as the guiding part 91C to be guided movably in the up and down direction with respect to the first moving body 81. The side surface on the left side of the thick part 91B is formed as the guiding part 91D to be guided movably in the up and down direction with respect to the first moving body 81.

The guiding part 91C is configured by an inclined surface inclined to the right side from the front to the back, and formed across the entire region in the up and down direction of the second moving body 91 along the up and down direction. The guiding part 91D is configured by an inclined surface inclined to the left side from the front to the back, and formed across about two thirds of the lower side in the up and down direction of the second moving body 91 along the up and down direction. The guiding part 91C and the guiding part 91D are formed in the second moving body 91 so as to be parallel to each other in the up and down direction.

The second moving body 91 is accommodated on the inside of the side plates 81A, 81B, 81C, and 81D of the first moving body 81 from the side of the opening 81F, and held at the first moving body 81 by the guide parts 85, 86 attached to the left and the right of the bottom plate 81E of the first moving body 81. The guide parts 85, 86 are formed with resin material such as polycarbonate, similar to the guiding parts 83, 84.

The guide part 85 is attached to the right side of the bottom plate 81E of the first moving body 81, that is, the inner side of the corner of the bottom plate 81E and the side plate 81A. The guide part 85 has a guide surface 85A on the left side thereof The guide surface 85A inclines to the right side from the front to the back. The guide part 85 presents a cross sectional shape of a substantially trapezoid shape cut at the plane in the left and right direction along the front and back direction. The length in the up and down direction of the guide surface 85A is the same length as the length in the up and down direction of the guiding part 91C. A boss (not shown) is formed at tow locations of the upper and lower parts at the surface on the back side of the guide part 85, and a boss hole $81I_1$ to be fitted with the boss 85B is formed at two locations of the upper and lower parts in the bottom plate 81E. The boss 85B is fitted to the boss hole $81I_1$ to position the guide part 85 with respect to the bottom plate 81E. The screw (not shown) is passed through the screw insertion hole 85C formed at three locations in the up and down direction of the guide part 85, and the relevant screw is screw coupled to the screw hole $81J_1$ formed at three locations in the up and down direction of the bottom pate 81E to fix the guide part 85 to the bottom plate 81E.

The guide part 86 is attached to the bottom plate 81E on the right side of the region 87 (square region surrounded by a chain dashed line) on the left end of the first moving body 81. The second driving system section 92 is attached to the region 87. The guide part 86 has a guide surface 86A on the right side thereof The guide surface 86A inclines to the left side from the front to the back. The guide part 86 presents a cross sectional shape of a substantially trapezoid shape, similar to the guide part 85. The length in the up and down direction of the guide surface 86A is the same length as the length in the up and down direction of the guiding part 91D.

The guide part 86 is also positioned with respect o the bottom plate 81E by the boss (not shown) arranged on the surface on the back side of the guide part 85 and the boss hole $81I_2$ formed at two locations of the upper and lower parts of the bottom plate 81E, similar to the guide part 85. The screw (not shown) is passed through the screw insertion hole (not shown) formed at three locations in the up and down direction of the guide part 86, and the relevant screw is screw coupled to the screw hole $81J_2$ formed at three locations in the up and down direction of the bottom pate 81E to fix the guide part 86 to the bottom plate 81E.

The guide part 85 and the guide part 86 are attached to the bottom plate 81E so that the guiding surface 85A and the guiding surface 86A are parallel in the up and down direction. The width in the left and right direction of attachment of the guide part 85 and the guide part 86 and the width in the left and right direction of the guiding part 91C and the guiding part 91D are set so that the guiding part 91C and the guiding part 91D fit exactly between the guide surface 85A and the guide surface 86A.

As described above, the guide surface 85A is an inclined surface on the left side which inclines to the right side from the front to the back, and the guiding surface 86A is an inclined surface on the right side which inclines to the left side from the front to the back. Therefore, the distance between the guiding surface 85A and the guiding surface 86A of the guide part 85 and the guide part 86 attached to the bottom plate 81E narrows from the back to the front. Therefore, the guide surface 85A, the guide surface 86A, and the front surface of the bottom plate 81E configure a so-called dovetail groove. The second moving body 91 is fitted into the dovetail groove with the guiding part 91C and the guiding surface 85A slidably contacting each other, and the guiding part 91D and the guiding surface 86A also slidably contacting each other, so that the second moving body 91 is held movable in the up and down direction with respect to the first moving body 81. That is, the second moving body 91 including the guiding parts 91C, 91D act as the dovetail fitted into the dovetail groove.

Figure 4:
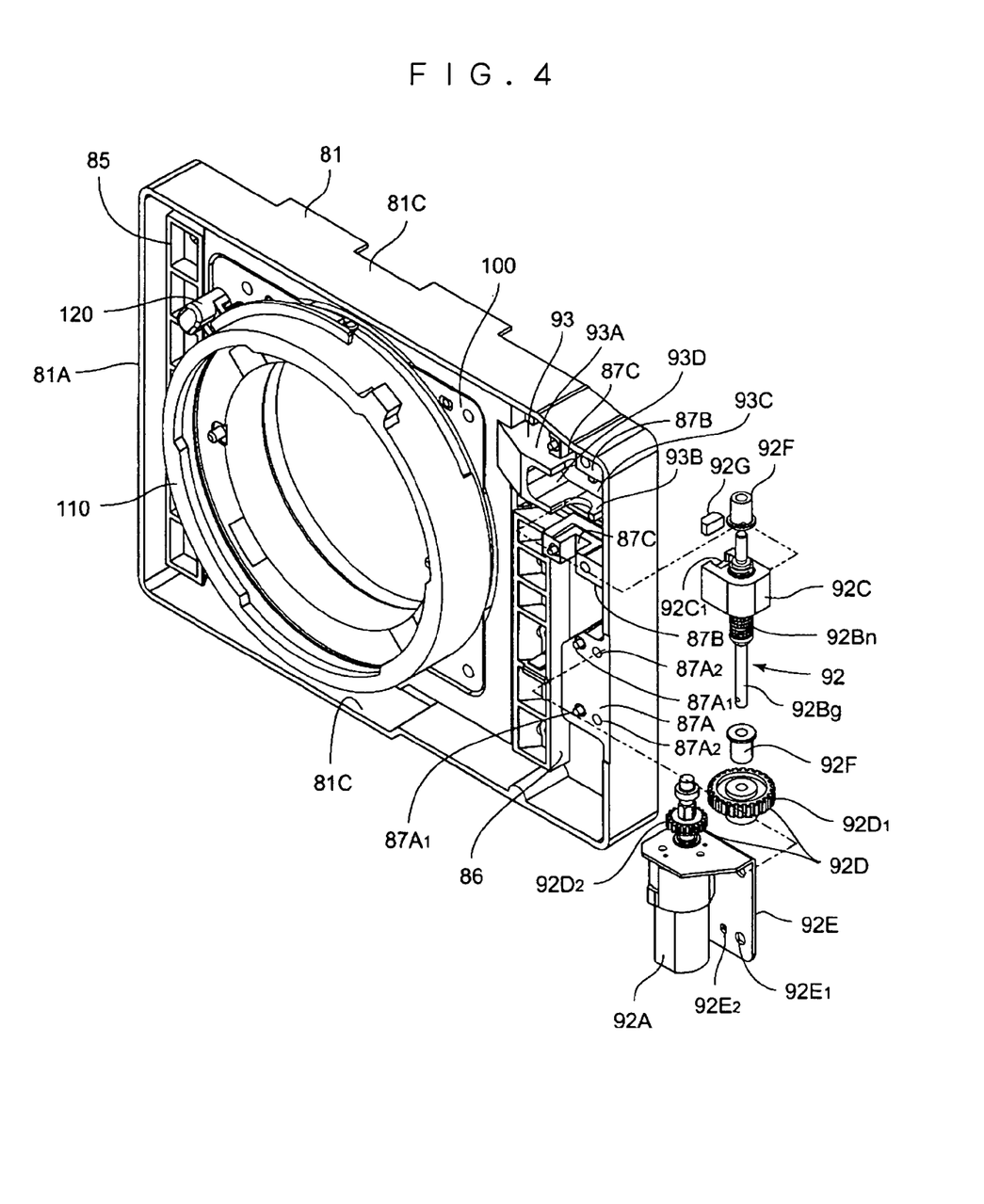
FIG. 4 is a view showing the state in which the first lens barrel shift mechanism, the second lens barrel shift mechanism, and the projection lens barrel etc. are attached in a perspective view, and showing the portion of the second driving system section incorporated in the second moving body in an exploded perspective view with respect to the projection display apparatus according to the embodiment of the present invention.

The second driving system section 92 will now be described with reference to FIGS. 2 to 4. FIG. 4 is a view showing the state in which the first lens barrel shift mechanism 80, the second lens barrel shift mechanism 90, and the projection lens barrel 60 etc. are attached in a perspective view, and showing the portion of the second driving system section 92 incorporated in the second moving body 91 in an exploded perspective view.

The second driving system section 92 includes a motor 92A, a feeding screw 92B, a coupling member 92C through which the feeding screw 92B passes and that screw couples with the feeding screw 92B at the pass through part, and a gear train 92D.

A motor attachment part 87A for attaching the motor 92A, and a feeding screw supporting part 87B for supporting the feeding screw 92B are arranged in a region 87 of the first moving body 81 attached with the second driving system section 92. The motor attachment part 87A is arranged slightly to the lower side from substantially the middle in the up and down direction of the first moving body 81. The feeding screw supporting part 87B is arranged above the motor attachment part 87A. Therefore, the second driving system section 92 is arranged at a position deviated to the upper side on the left end of the first moving body 81.

The motor attachment part 87A is formed at a table shaped portion in which the side plate 81B is bulged outward at thick thickness towards the inner side (left side). The boss $87A_1$ and the screw hole $87A_2$ are arranged in the motor attachment part 87A. The motor 92A is fixedly attached with respect to the first moving body 81 by way of a holder 92E fixed to the motor attachment part 87A. A screw insertion hole $92E_1$ and a boss hole $92E_2$ are formed in the holder 92E, where positioning of attachment of the holder 92E with respect to the motor attachment part 87A is performed by fitting the boss $87A_1$ to the boss hole $92E_2$. Furthermore, the screw (not shown) is passed through the screw insertion hole 92El and the relevant screw is screw coupled to the screw hole $87A_2$ to fix the holder 92E to the motor attachment part 87A.

Two screw supporting parts 87B or a pair of upper and lower screw supporting parts are arranged with a distance in the up and down direction. Each feeding screw supporting part 87B is integrally formed on the bottom plate 81E and the side plate 81B on the left side of the first moving body 81 and is arranged so as to project in a plate shape towards the front from the bottom plate 81E. A concave part from the front end side towards the back is formed at the front end part of the feeding screw supporting part 87B as a bearing part 87C for pivotally supporting the feeding screw 92B.

A shaft part 92Bg is arranged on both ends of the screw part 92Bn in the feeding screw 92B, which shaft part 92Bg is passed through the bearing sleeve 92F and the bearing sleeve 92F is fitted in the bearing portion 84C and fixed through method of adhesion and the like. That is, the feeding screw 92B is supported at the feeding screw supporting part 94B through the bearing sleeve 92F. The shaft part 92Bg is held in a freely rotating manner in the sleeve of the bearing sleeve 92F. The feeding screw 92B is thus held in a freely rotating manner with respect to the feeding screw supporting part 84B.

The shaft part 92B extending to the lower side of the coupling member 92C is formed longer than the shaft part 92Bg extending to the upper side of the coupling member 92C, and the shaft part 92Bg is projected from the lower side surface of the feeding screw supporting part 84B on the lower side while being supported at the feeding screw supporting part 84B. The gear $92D_1$ of large diameter of the gear train 92D is attached to the projecting portion. The gear $92D_2$ of the small diameter is attached to the output shaft of the motor 92A, and the rotational force of the motor 92A is reduced and transmitted to the feeding screw 92B via the gear train 92D configured by the gear $92D_2$ and the gear $92D_1$.

The coupling member 92C presents a substantially rectangular solid shape as a whole. The concave part $92C_1$ of substantially solid shape is formed at the upper side edge on the right side of the coupling member 92C, and a rubber strip 92G is fitted to the concave part $92C_1$. The rubber strip 92G is an elastically deformable elastic member that is formed by synthetic resin and the like such as silicon rubber having the size and shapes so as to fill the concave part $92C_1$.

The coupling member fit-in section 93 is formed on the side part of the left side of the second moving body 91. In the coupling member 92C, the portion including the concave part $92C_1$ towards the right from the portion where the feeding screw 92B passes and the back side portion of the portion where the feeding screw 92B passes are fitted into the coupling member fit-in section 93. The coupling member 92C is fitted to the coupling member fit-in section 93 so that rotation with the feeding screw 92B is inhibited, and so as to include contacting parts in the up and down direction. Therefore, when the coupling member 92C moves in the up and down direction by the feeding screw 92B, the second moving body 91 also moves with the guiding part 91C and the guiding part 91D guided by the guide part 85 and the guide part 86.

The configuration of the coupling member 92C and the coupling member fit-in section 93 will now be described in detail.

The coupling member fit-in section 93 is configured by upper and lower side plates 93A, 93B and a bottom plate 93C arranged on the back side with respect to the side plates 93A, 93B. In the coupling member fit-in section 93, a cross sectional shape cut at the plate in the up and down direction along the front and back direction is a substantially horseshoe shape having an opening at the front. The left side of the coupling member fit-in section 93 is formed as an opening 93D. That is, the coupling member 92C is fitted into a portion of a substantially horseshoe shape configured by the upper and lower side plates 93A, 93B and the bottom plate 93C.

The width (thickness) in the up and down direction of the coupling member 92C and the distance in the up and down direction on the inner side of the coupling member fit-in section 93, that is, the distance between the side plate 93A and the side plate 93B are set so that the width in the up and down direction of the coupling member 92C is slightly smaller than the distance on the inner side of the coupling member fit-in section 93. Furthermore, the width (thickness) in the front and back direction of the coupling member 92C and the supporting position in the front and back direction of the feeding screw 92B by the feeding screw supporting part 87B are set so that a slight gap is formed between the surface on the back side of the coupling member 92C and the bottom plate 93C of the coupling member fit-in section 93 when the feeding screw 92B is supported at the feeding screw supporting part 87B.

The rubber strip 92G fitted into the concave part $92C_1$ is configured so as to slightly project from the surface on the upper side of the concave part $92C_1$ (surface on the upper side of the coupling member 92C) and so that the width in the up and down direction of the coupling member 92C including the rubber strip 92G becomes slightly larger than the distance in the up and down direction on the inner side of the coupling member fit-in section 93. Therefore, the coupling member 92C is fitted so as to be pushed into the coupling member fit-in section 93 against the elasticity of the rubber strip 92G projecting from the concave part $92C_1$. That is, the surface on the lower side of the coupling member 92C contacts the surface on the upper side of the side plate 93B of the coupling member fit-in section 93, and the rubber strip 92G contacts the surface on the lower side of the side plate 93A.

The second driving system section 92 is configured as above, where the feeding screw 92B rotates by way of the gear train 92D when the motor 92A is rotated.

The coupling member 92C to be screw coupled to the feeding screw 92B attempts to rotate with the rotation of the feeding screw 92B, but the coupling member 92C does not rotate with the feeding screw 92B since the surface part on the back side of the coupling member 92C contacts the bottom plate 93C. Since a slight gap is formed between the surface part on the back side of the coupling member 92C and the bottom plate 93C, the coupling member 92C may slightly rotate with the rotation of the feeding screw 92B by the amount of the gap, but after rotating by the amount of the gap, the surface part on the back side of the coupling member 92C contacts the bottom plate 93C, and the rotation is inhibited.

The coupling member 92C which rotation with the feeding screw 92B is inhibited is moved in the up and down direction according to the rotating direction of the feeding screw 92B when receiving the action of the screw part 92Bn of the feeding screw 92B. The second moving body 91 arranged with the coupling member fit-in section 93 to which the coupling member 92C is fitted also moves in the up and down direction with the guiding part 91C and the guiding part 91D guided by the guide part 85 and the guide part 86.

As described above, since the coupling member 92C is simply fitted to the coupling member fit-in section 93 against the elasticity of the rubber strip 92G, the coupling member 92C and the coupling member fit-in section 93 are relatively movable in a direction crossing the axial direction of the feeding screw 92B.

In other words, since the coupling member 92C and the coupling member fit-in section 93 are relatively movable in a direction crossing the axial direction of the feeding screw 92B even if the feeding screw 92B is decentered, or the parallelism of the direction the first moving body 81 guides the second moving body 91 and the feeding screw 92B is slightly misaligned, and thus prevents excess load from being applied to the motor 92A due to misalignment. Furthermore, strip contact at the screw coupling of the screw part 92Bn of the feeding screw 92B and the coupling member 92C etc. is also prevented.

Since the rubber strip 92G applying elastic force on the coupling member 92C and the side plate 93A is interposed between the upper surface of the coupling member 92C and the side plate 93A of the coupling member fit-in section 93 with regards to the movement direction of the coupling member 92C, the relative movement of the coupling member 92C and the coupling member fit-in section 93 is suppressed, and production of backlash between the coupling member 92C and the coupling member fit-in section 93 is prevented. When a force of excess load for contracting the rubber strip 92G in the up and down direction acts between the coupling member 92C and the coupling member fit-in section 93, the rubber strip 92G contracts, and the excess load is prevented from being directly applied between the coupling member 92 and the coupling member fit-in section 93.

When the coupling member 92C and the coupling member fit-in section 93 relatively move in the direction crossing the axial direction of the feeding screw 92B, the rubber strip 92G between the upper surface of the coupling member 92C and the side plate 93A of the coupling member fit-in section 93 may elastically deform or the rubber strip 92G may slidably move with respect to the side plate 93A. Therefore, the relative movement between the coupling member 92C and the coupling member fit-in section 93 can be made smooth by appropriately setting the elasticity of the rubber strip 92G, the elastic deformation amount, or the frictional force between the rubber strip 92G and the side plate 93A.

The projection lens barrel 60 attached to a mount substrate 100 serving as a mount section by means of a mount ring 110 is arranged at the front of the second moving body 91. The configuration of attaching the projection lens barrel 60 to the second moving body 91 will now be described with reference to FIGS. 2, FIGS. 5A and 5B, FIGS. 6A to 6C and FIGS. 7A to 7C.

The inner side of the thick part 91B of the second moving body 91 is formed into a concave part in which the shape seen from the front is opened to a substantially square shape, and the mount substrate 100 is attached to the mount substrate supporting surface 91E, which is the bottom surface of the concave part.

The mount substrate 100 has a flange part 101 having the outer shape of a substantially square shape and a substrate side ring 102 which are integrally formed. A circular hole 100A to which the tube part 60B on the back end side of the projection lens barrel 60 is fitted is formed at the center of the mount substrate 100. The boss holes 101A are arranged on the left and the right on the upper side of the flange part 101. The boss 91F is arranged at the mount substrate supporting surface 91E at the position corresponding to the boss hole 101A. Furthermore, a screw insertion hole 101B is formed at four corners of the flange part 101. The screw holes 91G are formed in the mount substrate supporting surface 91E at positions corresponding to the screw insertion hole 101B. Therefore, the mount substrate 100 has the attachment position to the mount substrate supporting surface 91E positioned by the boss hole 101A and the boss 91F. The screw (not shown) is passed through the screw insertion hole 101B and screw coupled in the screw hole 91G in such positioned state to be fixedly attached to the mount substrate supporting surface 91E.

A shown in FIG. 2, a spacer plate 103 for adjusting the flange focal length of the projection lens barrel 60 is arranged at four locations at equidistant around the optical axis between the mount substrate 100 and the mount substrate supporting surface 91E. The spacer plate 103 is positioned by a boss hole 103A formed in the spacer plate 103 and a boss 91H arrange on the mount substrate supporting surface 91E. A screw insertion hole 103C is formed at the distal end of the convex tongue shaped portion 103B of the spacer plate 103, and the screw hole 91H is positioned at the back side of the screw insertion hole 103C while being positioned at the boss 91H. The spacer plate 103 has the stacking number and the thickness adjusted so that the flange focal length of the projection lens barrel 60 becomes a predetermined distance when the mount substrate 100 is attached to the mount substrate supporting surface 91E with the spacer plate 103 in between.

Figure 6A:
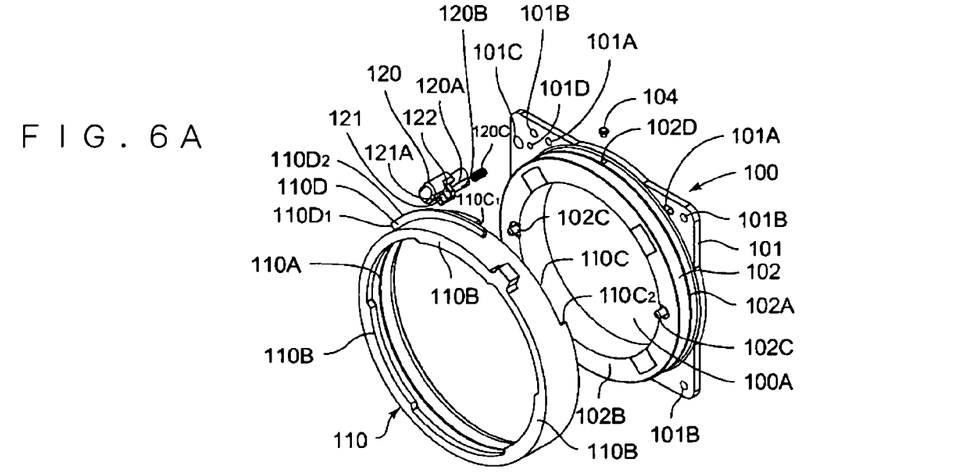
FIG. 6A is a perspective view seen from the upper left side from the front.
Figure 6B:
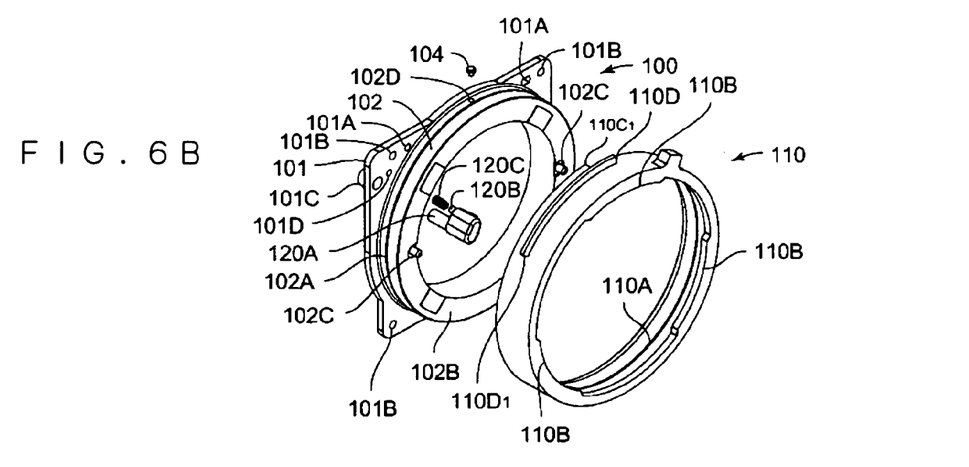
FIG. 6B is a perspective view seen from the upper right side form the front.
Figure 6C:
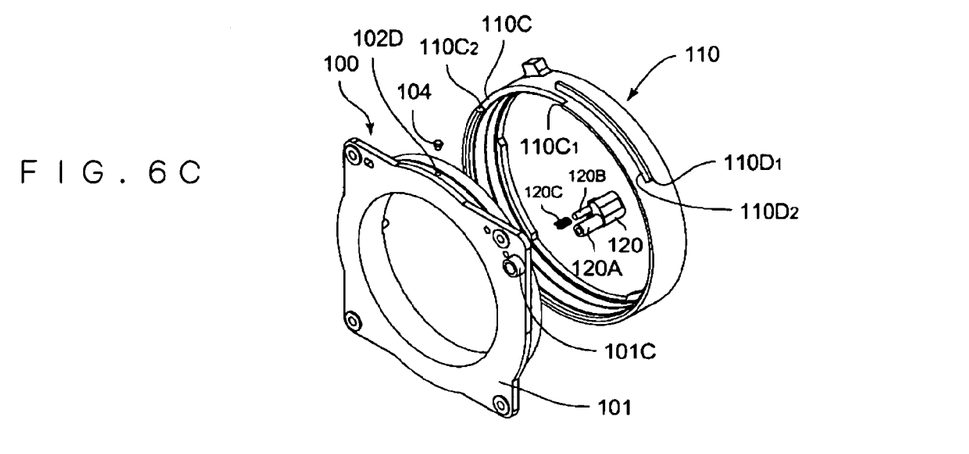
FIG. 6C is a perspective view seen from the upper right side from the back.

A male screw 102A screw coupled to a female screw 110A formed in the inner peripheral surface of the mount ring 110 is formed on the outer peripheral surface of the substrate side ring 102. The boss 102C is formed at two locations in the left and right direction with the optical axis in between on the mount surface 102B or the surface on the front side of the substrate side ring 102.

The mount ring 110 has three bayonet nails 110B projecting to the inner peripheral side of the surface on the front side formed at an interval of 120 degrees about the optical axis. The mount ring 110 is attached to the substrate side ring 102 with the female screw 110A screw coupled to the male screw 102A of the substrate side ring 102. The male screw 102A and the female screw 110A are formed so that the screw coupling amount increases, that is, the screws are tightened when the mount ring 110 is rotated in the left direction (clockwise direction when seen from the front).

Figure 7A:
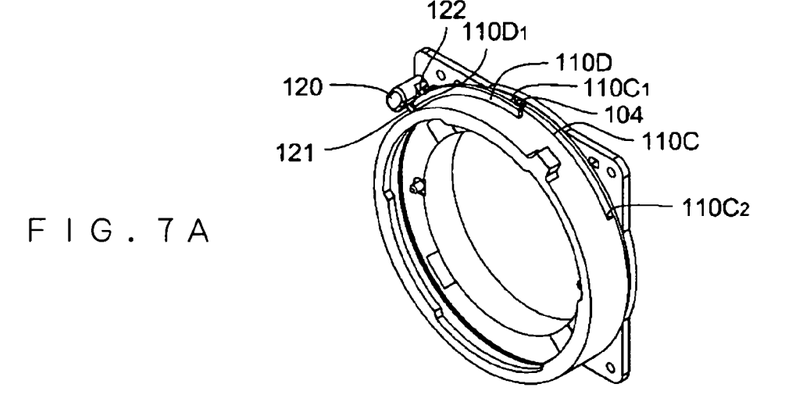
FIG. 7A is a perspective view seen from the upper left side from the front.
Figure 7B:
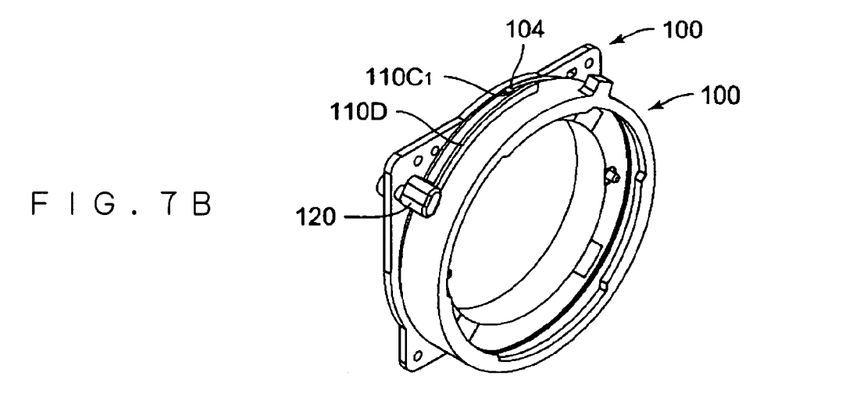
FIG. 7B is a perspective view seen from the upper right side form the front.
Figure 7C:
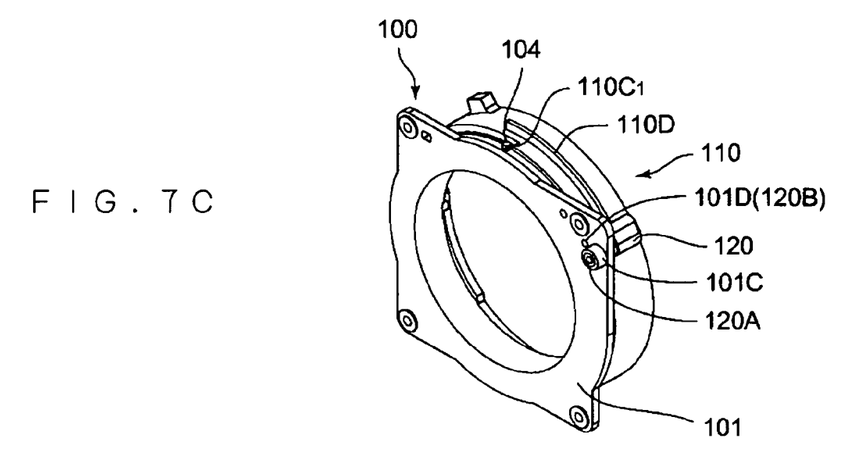
FIG. 7C is a perspective view seen from the upper right side from the back.

The screw 104 is screw coupled to the screw hole 102D formed at the top part of the outer peripheral surface of the substrate side ring 102 so as to project from the outer peripheral surface. A cut-out concave part 110C is formed from the back to the front at the edge on the back side of the mount ring 110. When the screw 104 is screw coupled to the screw hole 102D with the mount ring 110 screw coupled to the substrate side ring 102, and the screw hole 102D positioned in the concave part 110, the rotation of the mount ring 110 is regulated by the screw 104 and the concave part 110C. In other words, when the mount ring 110 rotates in the left direction, the edge $110C_1$ on the right end of the concave part 110C engages the screw 104 as shown in FIG. 7A, thereby inhibiting the rotation of the mount ring 110 in the left direction. When the mount ring is rotated in the opposite direction, the edge $110C_2$ on the left end of the concave part 110C engages the screw 104, thereby inhibiting the rotation of the mount ring 110 in the right direction. The screw 104 and the edge $110C_1$ of the concave part 110 thus serve as a rotation regulating element for inhibiting a rotation of the mount ring 110 in the tightening direction.

A rib 110D serving as an engagement element that project in the radial direction is formed on the outer peripheral surface of the mount ring 110 in the outer peripheral direction (about the optical axis) across the range of an angle of about 45 degrees. As shown in FIG. 5A and FIGS. 7A to 7C, the rib 110D is arranged so that a stopper plate 121 serving as a stopper element is positioned on the right side of the right side end $110D_1$ so that the right side end $110D_1$ engages the stopper plate 121 when the mount ring 110 is rotated to a position where the edge $110C_1$ of the concave part 110c and the screw 104 contact each other, that is, when the mount ring 110 is tightened. That is, the right side end $110D_1$ becomes the engagement part with respect to the stopper plate 121. The stopper plate 121 has a surface part 121A along the optical axis direction, and the right side end $110D_1$ of the rib 110D engages the stopper plate 121 by contacting the surface part 121A. When the right side end $110D_1$ engages the stopper plate 121, the rotation of the mount ring 110 in the right direction is inhibited. The stopper plate 121 is integrally configured with a button 120 on the side surface of the button 120 which is arranged at the upper right corner of the flange part 101 of the mount substrate 100.

When the mount ring 110 is rotated so as to be more on the right side from the position where the edge $110C_1$ of the concave part 110C contacts the screw 104, the right side end $110D_1$ is released from the engagement with the stopper plate 121. The distal end of the stopper plate 121 then contacts the surface $110D_2$ (hereinafter referred to as contacting surface $110D_2$) on the back side serving as the contacting part of the rib 110D which is the engagement element. In this state, the mount ring 110 can be rotated in the left and right direction. That is, the rotation of the mount ring 110 is allowed.

A bayonet flange 60A including three bayonet nails 60a projecting to the outer peripheral side is arranged in the projection lens barrel 60. The bayonet nails 60a are formed at an interval of every 120 degrees about the optical axis. A boss hole (not shown) to which the boss 102C of the mount surface 102B is fitted is formed at the surface on the back side of the bayonet flange 60A.

Figure 5A:
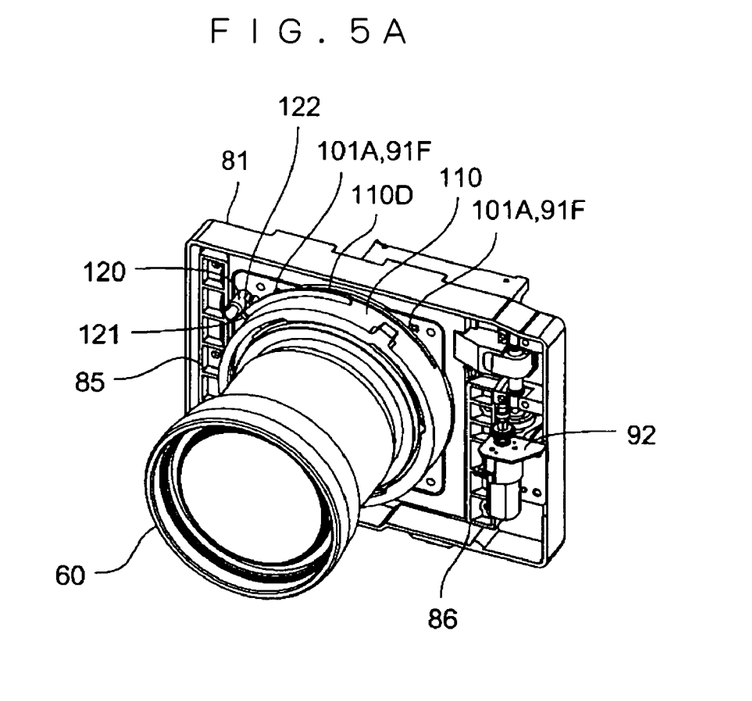
FIG. 5A is a view showing a state in which the mount ring is rotated to a predetermined position in the tightening direction, and the projection lens barrel is fixed to the mount substrate.

When the mount ring 110 is rotated to the right side, the mount ring 110 displaces towards the front by the action of the male screw 102A and the female screw 110A, and the screws loosen. When the mount ring 110 is rotated to the right side up to the position where the edge $110C_2$ of the concave part 110C engages the screw 104, a gap to where the bayonet nail 60a can enter is formed between the bayonet nail 110B and the mount surface 102B. In this state, the bayonet nail 60a is passed between the bayonet nails 110B, and the surface on the back side of the bayonet flange 60A of the projection lens barrel 60 is contacted to the mount surface 102B with the boss hole (not shown) of the projection lens barrel 60 matched with the boss 102C of the mount surface 102B. The mount ring 110 is then rotated in the left direction to tighten the mount ring 110 with respect to the substrate side ring 102. When the mount ring 110 is tightened to the substrate side ring 102, the bayonet nail 60a of the bayonet flange 60A becomes sandwiched between the mount surface 102B and the bayonet nail 110B of the mount ring 110, and the projection lens barrel 60 is fixed with respect to the mount substrate 100, as shown in FIG. 5A.

The tightening force between the male screw 102A and the female screw 110A of when the mount ring 110 is tightened to the substrate side ring 102 until the end $110C_1$ of the concave part 110C engages the screw 104 and the rotation of the mount ring 110 is inhibited is an extent the force of excess load that may break the male screw 102A and the female screw 110A is not generated, and is an extent of applying force to reliably fix the projection lens barrel 60 to the mount substrate 100 by strongly sandwiching the bayonet flange 60A between the mount surface 102B and the bayonet nail 110B of the mount ring 110. The position and the like of the edge $110C_1$ are set so that such tightening force is generated between the male screw 102A and the female screw 110A.

The stopper plate 121 is positioned on the right side of the right side end $110D_1$ of the rib 110D in a state that the mount ring 110 is rotated to a position where the edge $110C_1$ of the concave part $110C_1$ contacts the screw 104. Thus, even if the mount ring 110 is further attempted to be rotated to the right side, the right side end $110D_1$ engages the stopper plate 121, and thus the rotation of the mount ring 110 is inhibited and the loosening of the mount ring 110 is prevented.

Figure 5B:
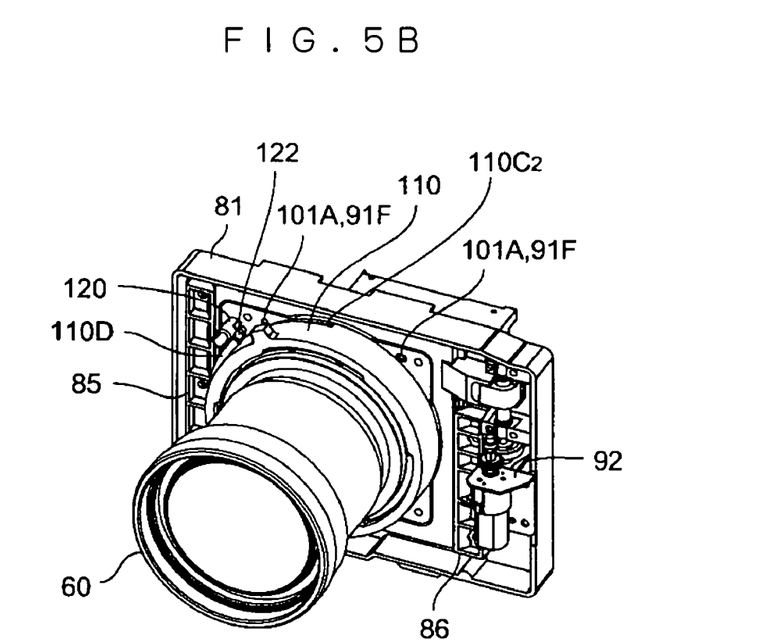
FIG. 5B is a view showing a state in which the mount ring is rotated to a position where the projection lens barrel can be detached from the mount substrate.

The rib 110D is formed longer than at least the width in the left and right direction of the concave part 110C, that is, the distance between the edge $110C_1$ and the edge $110C_2$ towards the left side from the position where the right side end $110D_1$ engages the stopper plate 121. Therefore, if the mount ring 110 is rotated within the range from where the edge $110C_1$ is separated from the screw 104 and to where the edge $110C_2$ engages the screw 104, the contacting surface $110D_2$ of the rib 110D contacts the front end of the stopper plate 121, and the stopper plate 121 is displaced backward, as shown in FIG. 5B. The engagement of the right end $110D_1$ of the rib 110D and the stopper plate 121 is released in this state. Thus, the mount ring 110 is allowed to rotate within the range in the left and right direction of the concave part 110C.

In addition to the stopper plate 121, the shaft parts 120A, 120B and the contacting plate 122 serving as the contacting part are formed on the button 120 integrally with the button 120. The shaft parts 120A, 120B are arranged projecting to the back side surface of the button 120. The shaft part 120A is supported slidably movable in the front and back direction (axis direction) at the sleeve 101C formed on the flange part 101. The shaft part 120B is inserted so as to be slidably movable in the front and back direction (axis direction) to the hole part 101D formed in the flange part 101. A coil spring 120C serving as a biasing element is arranged between the front surface of the flange part 101 and the back surface of the button 120 on the bearing part 120B side.

The contacting plate 122 projects from the end on the back side of the surface part 121A of the stopper plate 121 to the rib 110D side perpendicularly with respect to the surface part 121A, whereby a substantially L shape is formed with the stopper plate 121.

When the mount ring 110 is positioned within the rotation position from the position where the edge $110C_2$ of the concave part 110C engages the screw 104 to right before the engagement with the screw 104 of the edge $110C_1$, the front end of the stopper plate 121 is arranged so as to contact the contacting surface $110D_2$ of the rib 110D. Therefore, the stopper plate 121 is pushed backwards against the biasing force of the coil spring 120C by the contacting surface $110D_2$, and is displaced to the non-locked position where the engagement with the right side end $110D_1$ of the rib 110D is released. Since the contacting plate 122 is integrally configured with the button 120 with the stopper plate 121, the contacting plate 122 is also displaced backward.

When the mount ring 110 is rotated to a predetermined position in the tightening direction, the contacting surface $110D_2$ of the rib 110D is released from the front end of the stopper plate 121, as shown in FIG. 5A and FIGS. 7A to 7C. The predetermined position is a position where the mount ring 110 is tightened to the substrate side ring 102 so that the tightening force between the male screw 102A of the substrate side ring 102 and the female screw 110A of the mount ring 110 is about an extent that the force of excess load that may break the male screw 102A and the female screw 110A is not generated and is an extent a force is applied to sandwich the bayonet flange 60A between the mount surface 102B and the bayonet nail 110B of the mount ring 110 so as to reliably fix the projection lens barrel 60 to the mount substrate 100. That is, the predetermined position is a position where the edge $110C_1$ contacts the screw 104 or right before, where the mount ring 11 is tightened to the substrate side 102 to the position where substantially the same tightening force as when rotated until contacting is generated between the male screw 102A and the female screw 110A.

When the mount ring 110 is rotated to the predetermined position, the stopper plate 121 moves forward by the biasing force of the coil spring 120C, and displaces to the locked position for engaging the right side end $110D_1$ of the rib 110D. In other words, when the mount ring 110 is rotated to the predetermined position in the tightening direction with respect to the substrate side ring 102, the stopper plate 121 automatically displaces to the locked position and the mount ring 110 is inhibited from rotating in the loosening direction. The contacting plate 122 integrally arranged with the stopper plate 121 on the button 120 also displaces forward with the stopper plate 121. As the contacting plate 122 contacts the contacting surface 110D$_2$ of the rib 110D, the displacement of the stopper plate 121 integrally arranged with the contacting plate 122 on the button 120 also stops and is held at the locked position.

When the mount ring 110 is rotated to the predetermined position, the stopper plate 121 automatically displaces to the locked position, and the mount ring 110 is inhibited from rotating in the loosening direction. Furthermore, the contacting plate 122 integrally arranged with the stopper plate 122 on the button 120 also displaces forward with the stopper plate 121. As the contacting plate 122 contacts the contacting surface 110D$_2$ of the rib 110D, the displacement of the stopper plate 121 integrally arranged with the contacting plate 122 on the button 120 also stops and is held at the locked position.

In a state the stopper plate 121 is held at the locked position, the rotation of the mount ring 110 is inhibited since the stopper plate 121 engages the right end 110D$_1$ of the rib 110De even if attempting to rotate the mount ring 110 to the right side for loosening. That is, the mount ring 110 is prevented from loosening.

As described above, when the contacting surface 110D$_2$ of the rib 110D is released from the front end of the stopper plate 121 and the contacting plate 122 contacts the contacting surface 110D$_2$ of the rib 110D, that is, when the stopper plate 121 is displaced from the non-locked position to the locked position, the contacting plate 122 collides against the contacting surface 110D$_2$ of the rib 110D due to the biasing force of the spring 120C. The collision noise and vibration of the collision occur as a result, and the worker is able to recognize that the mount ring 110 has been tightened to the predetermined position. That is, the worker feels the collision noise and the vibration of the collision that occur when the contacting plate 122 and the contacting surface 110D$_2$ of the rib 110D collide, or that the mount ring 110 has been rotated to the predetermined position (position where the edge 101C$_2$ contacts the screw 104) in the tightening direction as a click.

When detaching the projection lens barrel 60 from the flange part 101, the button 120 is pushed backward, and the stopper plate 121 is displaced to the non-locked position where the engagement with the right side end 110D of the rib 10D is released. As shown in FIG. 5B, the mount ring 110 is then rotated until the edge 110C$_2$ on the left side of the concave part 110C contacts the screw 104, and the tightening of the mount ring 110 with respect to the substrate side ring 102 is loosened. When the mount ring 110 is rotated up to this point, the bayonet flange 60A on the projection lens barrel 60 side can be rotated about the optical axis between the bayonet nail 110B of the mount ring 110 and the mount surface 102B, and thus the bayonet nail 60a can be removed from the mount ring 110 through between the bayonet nails 10B.

The periphery in the up and down, left and right direction of the mount substrate 100 is covered by an exterior housing (not shown). Thus, the button 120 is difficult to operate from the top, bottom, left or right. However, in the present embodiment, the engagement with the rib 110D can be released by displacing the stopper plate 121 that is biased from the back to the front by the coil spring 120C backward against the biasing force to the locked position. Thus, the button 120 integrally formed with the stopper plate 121 can be operated from the front towards the back that is not covered by the exterior housing to release the engagement between the stopper plate 121 and the rib 110D. That is, the task of releasing the engagement between the stopper plate 121 and the rib 110D can be easily performed.

The rotation regulating element is configured by the edge C$_1$ of the concave part 110C formed in the mount ring 110 and the screw 104 in the above described embodiment, but a groove part may be formed along the periphery of the optical axis on the outer peripheral surface of the substrate side ring 102, and the screw for engaging both ends of the groove part may be formed on the mount ring side 110. Furthermore, the stopper element doe not need to be a plate shape such as the stopper plate 121, and may be a rod shape etc. Other than the coil spring 120C, the elastic element such as rubber may be used as the biasing element. The engagement of the engagement element and the stopper element may have a configuration in which the engagement element and the stopper element engage as the stopper element fit into a concave part formed in the engagement element. For example, the rotation of the mount ring 110 can be inhibited by forming the concave part to which the stopper plate 121 is fitted at the surface on the back side of the rib 110D.

While the invention has been shown and described in detail, the foregoing description is in all aspects illustrative and not restrictive. It is therefore understood that numerous modifications and variations can be devised without departing from the scope of the invention.

What is claimed is:

1. A projection display apparatus in which a projection lens barrel is capable of being interchanged; the projection display apparatus comprising:
   a rotation regulating element for inhibiting a rotation in a tightening direction of a mount ring for fixing said projection lens barrel to said projection display apparatus;
   a stopper element displaceable between a non-locked position for allowing the rotation of said mount ring and a locked position for inhibiting the rotation of said mount ring in a loosening direction, and biased from said non-locked position to said locked position by a biasing element; and
   an engagement element, arranged on said mount ring, for displacing said stopper element to the non-locked position against a bias by said biasing element by contacting a front end of said stopper element when said mount ring is rotated to a rotating position in the loosening direction from a predetermined position to be tightened, and being released from contact with said stopper element and engaging said stopper element displaced to said locked position in the loosening direction of said mount ring when said mount ring is rotated to said predetermined position.

2. The projection display apparatus according to claim 1, further comprising a contacting part displaced with said stopper element by being biased by said biasing element, and contacted to said engagement element when said stopper element is positioned at said locked position.

3. The projection display apparatus according to claim 1, wherein said stopper element is displaced from said locked position to said non-locked position by being pushed in an attachment direction of said projection lens barrel.

* * * * *